United States Patent Office 3,063,971
Patented Nov. 13, 1962

3,063,971
POLYGYCOL SULFIDE-LINKED BLOCK COPOLYMERS
Frank A. Stuart, Orinda, and Donovan R. Wilgus, Richmond, Calif., assignors to California Research Corporation, San Francisco, Calif., a corporation of Delaware
No Drawing. Filed June 22, 1959, Ser. No. 821,681
6 Claims. (Cl. 260—79)

This invention relates to novel block copolymers. More particularly, the invention is concerned with important new polyglycol sulfide-linked block copolymers useful as detergents and dispersants in mineral lubricating oils and hydrocarbon fuels and also as surface-active agents for other general applications.

The compounds of the invention are polyglycol sulfide-linked block copolymers of (A) a polymer of at least one monomer selected from the class consisting of olefins of from 2 to 30 carbon atoms, unsaturated ethers and unsaturated esters containing a single polymerizable ethylenic bond and (B) a polyalkylene glycol, said block copolymer containing from about 40 to about 96% by weight of hydrocarbon oil-solubilizing groups from said polymerized monomer and from about 4 to about 60% by weight of polyglycol groups, said oil-solubilizing groups being selected from the class consisting of aliphatic and cycloaliphatic hydrocarbon groups of at least 4 carbon atoms each, said polyalkylene glycols having at least 5 alkylene oxide units each, from 2 to 7 carbon atoms in each alkylene group and a molecular weight between about 220 and 30,000, said block copolymer having a total molecular weight of at least about 2,000 as measured by the light scattering method and a solubility in lubricating oil of at least 0.0005% by weight.

The monomers of component (A) of the block copolymers of this invention can be any compound having at least one ethylenic linkage which is characterized by the ability to polymerize through said ethylenic linkage in the presence of a conventional free radical initiator catalyst and which will provide the above-mentioned 40 to 96% by weight of hydrocarbon oil-solubilizing groups to the block copolymer. They may also be illustrated by the following general formula:

$$R_1(G')_{n'}CH=CH(G)_nR_2$$

in which $R_1$ and $R_2$ are members of the group consisting of hydrogen and hydrocarbon radicals of from 4 to 30 carbon atoms, at least one of which is an aliphatic hydrocarbon group of from 4 to 30 carbon atoms in the case of the ether and ester monomers as described above, G and G' are members of the class consisting of oxy(—O—) ether and carbonyloxy

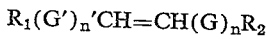

ester groups and $n$ and $n'$ are 0 or 1. The hydrocarbon radicals may be alkyl, cycloalkyl, alkenyl, alkaryl.

Representative monomers of the above types include the following:

Olefins:
    Ethylene
    Propylene
    Di- and triisobutylene
    Octadecene-1
Ethers:
    Vinyl n-butyl ether
    Vinyl 2-ethylhexyl ether
    Methallyl n-decyl ether
    1-eicosenyl decyl ether Esters:
    Vinyl oleate
    Allyl stearate
    Dodecyl acrylate
    Hexadecyl methacrylate
    Vinyl p-n-octyl benzoate
    Cyclohexyl methacrylate
    n-Butyl-2-eicosenoate
    Dihexadecyl maleate
    Didodecyl maleate
    1-decenyl laurate Although any of the monomers described above will give the polyglycol sulfide-linked block copolymers of the invention, the higher alkyl esters of α,β-unsaturated monocarboxylic acids of from 3 to 8 carbon atoms having alkyl groups of from 8 to 30 carbon atoms are preferred, both for availability and effectiveness of copolymers prepared from them.

The polyglycol group of the compounds of the invention preferably contains at least 5 alkylene oxide units with alkylene groups of from 2 to 7 carbon atoms each as previously mentioned. Up to about 690, preferably 230, of these alkylene oxide units may be present in the polyglycol group. The end of the polyglycol group other than that linked to the sulfide group may be hydroxyl or alkyl, or it may have other terminal groups, including polar groups.

Poly-1,2-alkylene glycols and their alkyl ethers are preferred. For present purposes, the most suitable poly-1,2-alkylene glycol groups are those derived from ethylene oxide of from 1,2-propylene oxide or mixtures thereof which have molecular weights or average molecular weights between about 220 and 30,000, preferably between about 400 and 10,000. These polyalkylene glycol groups provide outstanding detergent copolymers.

The following polyalkylene glycol groups containing from 2 to 7 carbon atoms in each alkylene group are illustrative of the types described above:

—(CH$_2$—CH$_2$—O)$_5$—OC$_2$H$_5$
—(CH$_2$—CH$_2$—O)$_7$—CH$_2$CH$_2$N(C$_2$H$_5$)$_2$

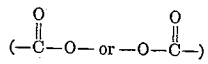

—[CH(CH$_3$)CH$_2$—O]$_5$—C$_6$H$_5$
—[CH(CH$_3$)CH$_2$—O]$_7$—SC$_{12}$H$_{25}$
—[CH$_2$—CH$_2$—O—CH(CH$_3$)CH$_2$—O]$_5$—H
—(CH$_2$—CH$_2$—O)$_9$CH$_3$
—(CH$_2$—CH$_2$—O)$_{13}$—C$_8$H$_{17}$
—(CH$_2$—CH$_2$—O)$_{13}$—C$_{12}$H$_{25}$
—(CH$_2$—CH$_2$—O)$_{13}$—C$_{18}$H$_{37}$
—[CH$_2$—CH(CH$_3$)—O]$_{30}$H
—(CH$_2$—CH$_2$—CH$_2$O)$_{40}$H
—(C$_5$H$_{10}$O)$_5$H

Polyethylene glycol mixtures having average molecular weights of 220, 400, 1000, 1540, 2000 or 10,000 and monoalkyl ethers thereof.
Poly-1,2-propylene glycol mixtures having average molecular weights of 425, 1025 or 10,000 and monoalkyl ethers thereof.

The polyglycol sulfide-linked block copolymers of the invention may also be illustrated by the general structural formula:

$$A—S—(R_3O)_nR_4$$

wherein A is a polymer of at least one monomer having oil-solubilizing groups selected from the class consisting of aliphatic and cycloaliphatic hydrocarbon groups of at least 4 carbon atoms each, said oil-solubilizing groups amounting to about 4 to about 60% by weight of the polyglycol sulfide-linked block copolymer, $R_3$ is an alkylene group of 2 to 7 carbon atoms, $R_4$ is a member of the group consisting of hydrogen and alkyl groups of 1 to 18 carbon atoms, preferably hydrogen, and $n$ is an integer indicating the number of oxyalkylene groups in the polyalkylene glycol equal to a total molecular weight between about 220 and 30,000.

The polyglycol sulfide-linked block copolymers according to the invention are prepared by various methods. According to one particularly satisfactory method of preparation, a polyglycol mercaptan is reacted with a monomer of the kind previously described with regard to the (A) polymer component. The reaction is carried out in the presence of a conventional free radical initiator. The polyglycol mercaptan functions as a chain transfer agent. The monomer units add on in a continuous fashion during the reaction to provide the polymeric (A) component and the completely formed polyglycol sulfide-linked block copolymer.

The preparation of the polyglycol sulfide-linked block copolymers is conveniently carried out in the presence of an inert organic solvent such as benzene, toluene, xylene or petroleum naphtha. The free radical-liberating type of initiator catalyst may be benzoyl peroxide, tertiary-butyl hydroperoxide or azobisisobutyronitrile. The initiator is employed in small amounts of from about 0.1 to 10% by weight, preferably 0.1 to 2%, and may be added in increments as the reaction proceeds in order to maintain constantly desired reaction conditions.

In preparing the polyglycol sulfide-linked block copolymers of the invention, it is important to obtain an oil-soluble final product, that is, one which is soluble in lubricating oil or other hydrocarbon fraction to the extent of at least 0.0005% and preferably 0.5% or more by weight. Since the various oil-solubilizing aliphatic hydrocarbon groups differ somewhat in their oil-solubilizing characteristics, preliminary tests are carried out with the additive to determine whether the relative proportion of aliphatic hydrocarbon in the block copolymer is high enough to impart the desired degree of oil solubility. If the solubility in oil is unduly low, the proportion of aliphatic hydrocarbon groups is easily increased to raise the oil solubility to the desired level in accordance with the methods already described. In general, satisfactory oil solubility and surface-active properties are obtained with block copolymers wherein the aliphatic and cycloaliphatic oil solubilizing hydrocarbon groups constitute from about 40 to about 96% by weight of the block copolymer.

The polyglycol sulfide-linked copolymers of the invention have apparent molecular weights as determined by standard light scattering methods of at least 2,000. For practical purposes, molecular weights of from 50,000 to 500,000 are particularly suitable from the standpoint of viscosity and other physical characteristics of the block copolymer additives.

The following examples are illustrative of the various polyglycol sulfide-linked block copolymers of the invention. Unless otherwise specified, the proportions are given on a weight basis.

*Example I*

This example shows the preparation of β,β'-dihydroxyethyldisulfide intermediate according to the following reaction:

2HOCH₂CH₂SH+I₂→
    HOCH₂CH₂—S—S—CH₂CH₂OH+2HI

To a solution of iodine (77 grams, 0.3 mole) and pyridine (23.7 grams, 0.3 mole) in 400 ml. of ether was added slowly with stirring a solution of 2 mercaptoethanol (23.4 grams, 0.3 mole) in 100 ml. of ether. After 2 hours, pyridine (31.6 grams, 0.4 mole) was added to remove orange-yellow color. The ether solution was decanted from the salt, dried over calcium sulfate for 45 minutes and finally filtered. The filtrate was concentrated on the steam plate until two phases formed. The bottom phase (12.1 grams), which contained the disulfide, was collected. The top phase was concentrated on the steam plate to obtain a second disulfide fraction (9.0 grams). After combining the two fractions, the total concentrate was extracted with three 30 ml. portions of benzene to remove residual 2-mercaptoethanol. To insure complete removal of mercaptan, mesitylene (38 grams) was added to the disulfide layer and product was topped to 88° C. at 3 mm. mercury pressure. The crude disulfide was obtained in 27.5% yield.

*Example II*

This example illustrates the preparation of polyethylene glycol disulfide intermediate according to the following reaction:

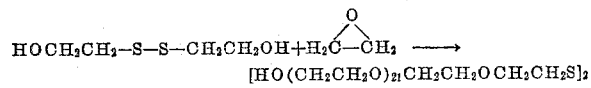

HOCH₂CH₂—S—S—CH₂CH₂OH+H₂C—CH₂ ⟶
                   [HO(CH₂CH₂O)₂₁CH₂CH₂OCH₂CH₂S]₂

The mixture of the disulfide (10.7 grams, 0.07 mole), sodium methylate (0.695 gram, 0.013 mole) and 40 ml. of toluene was heated to reflux. After the toluene-methanol azeotrope (0.5 ml.) was distilled off, the excess toluene was removed under vacuum to yield 11.6 grams of crude β,β'-dihydroxyethyl disulfide in which some of the hydroxyl groups were converted to the sodio salt. 6.4 grams of this product was changed to a 1-liter rocker type autoclave. After flushing the system with nitrogen, the temperature was increased slowly, and ethylene oxide was introduced at ca. 50 grams per hour by means of a proportioning pump. When the temperature reached 50° C. and 100 grams of ethylene oxide had been added, the exothermic reaction started and the temperature increased to 110°C. The temperature was then maintained at 110 ± 10°C. by adding ethylene oxide and heat. A total of 700 grams of ethylene oxide was added over a total reaction time of 10 hours. Throughout the reaction, the pressure remained at about 200 pounds per square inch gauge. After allowing the autoclave to cool to 70° C., the product was removed and dissolved in 300 ml. of benzene. This solution was treated with 6 ml. of concentrated hydrochloric acid to neutralize the salt, and then water, excess acid and benzene were removed under reduced pressure to yield 656 grams of polyethylene glycol disulfide.

*Example III*

This example shows the preparation of polyethylene glycol mercaptan intermediate according to the following reaction:

HO(CH₂CH₂O)₂₂CH₂CH₂S—S
    —CH₂CH₂(OCH₂CH₂)₂₂OH
        +H₂→2HO(CH₂CH₂O)₂₂CH₂CH₂SH

A mixture of polyethylene glycol disulfide (267 grams, 0.0012 mole), 30 mesh zinc metal (100 grams, 1.54 moles), 200 ml. of glacial acetic acid and 557 ml. of benzene was maintained under reflux with stirring for 8 hours. The reaction mixture was filtered and the benzene and acetic acid removed by vacuum distillation to yield 250 grams of polyethylene glycol mercaptan (molecular weight about 10,000).

*Example IV*

This example illustrates the preparation of polyethylene glycol sulfide-linked polyalkyl methacrylate block copolymer in which the alkyl methacrylates are mixed octadecyl and tridecyl methacrylate.

A mixture of octadecyl methacrylate and tridecyl methacrylate (40:60 weight ratio) amounting to 220 grams (0.07 mole) and 73 grams of polyethylene glycol mercaptan (0.0073 mole) prepared as above were mixed with 410 ml. of benzene. The mixture was refluxed under a nitrogen atmosphere with stirring. After the initial addition of 3.9 ml. of a 1% solution of bisazoisobutyronitrile, the initiator catalyst level was maintained at 0.015% by adding 1.9 ml. of 1% solution every 15 minutes. After four hours, the reaction mixture was allowed to come to room temperature. A sample of approximately 100 grams was taken and the polymer was precipitated with acetone to remove unreacted monomer.

The polyglycol sulfide-linked block copolymer obtained above was dissolved in benzene and this solution was added to 20 grams of 150 neutral mineral lubricating oil. The mixture was then stripped at a temperature of 120° C. at a pressure of 5 mm. of mercury to yield a 30% oil concentrate of block copolymer detergent. This concentrate was used in the preparation of hydrocarbon compositions for detergency tests.

Detergency tests were carried out to show the effectiveness of the polyglycol sulfide-linked block copolymers of the invention as dispersants. In these tests, 0.5 gram of lamp black was suspended in 100 mm. of light hydrocarbon oil along with 0.1 gram of the block copolymer in a graduated glass cylinder. The suspension was observed over a period of time of several hours to determine sedimentation.

In the carbon black suspension test as outlined above, the polyglycol sulfide-linked block copolymer of Example IV gave a 100% suspension for over 48 hours, as contrasted to the control suspension of similar oil and carbon black without a block copolymer which gave a suspension of only 10% after no more than one-half hour's time.

In the following table, additional examples of the polyglycol sulfide-linked block copolymers of the invention are given. In these examples, the block copolymers are prepared by the procedures outlined in the preceding examples.

| Example No. | Polymerizable Monomer | Polyalkylene Glycol Mercaptan |
|---|---|---|
| V | Ethylene | Poly-1,2-propylene glycol mercaptan (15 moles 1,2-propylene oxide). |
| VI | Vinyl 2-ethylhexyl ether | Octadecyl ether of eicosaethylene glycol mercaptan. |
| VII | Allyl stearate | Polyethylene glycol, polypropylene glycol mercaptan (10 moles of ethylene oxide and 1,2-propylene oxide in approximately 1:1 mole ratio). |
| VIII | Dihexadecylmaleate | Methylmonoether of polyethylene glycol mercaptan (average mole weight 750). |
| IX | 1-decenyl laurate | Poly-1,3-propylene glycol mercaptan (4 moles of 1,3-propylene oxide). |

Other variations in the types of polyalkylene glycol sulfide-linked block copolymers within the scope of this invention will be apparent to one skilled in the art from the above illustrative examples.

We claim:

1. An oil-soluble polymer of (A) polymerizable oil-solubilizing compounds selected from the group consisting of olefinic hydrocarbons, olefinic ethers containing a single oxygen atom, and hydrocarbon carboxylic acids containing at most two carboxy groups fully esterified with monohydroxy hydrocarbons, said compounds having a single ethylenic linkage and containing a monovalent hydrocarbon group of from 2 to 30 carbon atoms and (B) polyalkylene glycol mercaptan, said polymer containing from about 40 to about 96% by weight of hydrocarbon oil-solubilizing groups and from about 4 to about 60% by weight of polyalkylene glycol groups, said oil-solubilizing groups being selected from the class consisting of aliphatic and cycloaliphatic hydrocarbon groups of at least 4 carbon atoms each and said polyalkylene glycol groups having at least 5 alkylene oxide units each, from 2 to 7 carbon atoms in each alkylene group and a molecular weight between about 220 and 30,000, said polymer having a total molecular weight of at least 2,000 as measured by the light scattering method and a solubility in oil of at least 0.0005% by weight.

2. An oil-soluble polymer of (A) polymerizable oil-solubilizing ester of hydrocarbon carboxylic acids containing at most two carboxy groups fully esterified with monohydroxy hydrocarbons, said esters having a single ethylenic linkage and containing a monovalent hydrocarbon group of from 4 to 30 aliphatic carbon atoms and (B) polyalkylene glycol mercaptan, said polymer containing from about 40 to about 96% by weight of hydrocarbon oil-solubilizing groups and from about 4 to about 60% by weight of polyalkylene glycol groups, said oil-solubilizing groups being selected from the class consisting of aliphatic and cycloaliphatic hydrocarbon groups of at least 4 carbon atoms each and said polyalkylene glycol groups having at least 5 alkylene oxide units each, from 2 to 7 carbon atoms in each alkylene group and a molecular weight between about 220 and 30,000, said polymer having a total molecular weight of at least 2,000 as measured by the light scattering method and a solubility in oil of at least 0.0005% by weight.

3. An oil-soluble polymer of (A) at least one alkyl methacrylate having 8 to 30 carbon atoms in the alkyl group and (B) polyalkylene glycol mercaptan, said polymer containing from about 40 to about 96% by weight of hydrocarbon oil-solubilizing groups and from about 4 to about 60% by weight of polyalkylene glycol groups, said oil-solubilizing groups being selected from the class consisting of aliphatic and cycloaliphatic hydrocarbon groups of at least 4 carbon atoms each and said polyalkylene glycol groups having at least 5 alkylene oxide units each, from 2 to 7 carbon atoms in each alkylene group and a molecular weight between about 220 and 30,000, said polymer having a total molecular weight of at least 2,000 as measured by the light scattering method and a solubility in oil of at least 0.0005% by weight.

4. A polymer according to claim 3 in which the polyalkylene glycol mercaptan is polyethylene glycol mercaptan.

5. A polymer according to claim 3 in which the polyalkylene glycol mercaptan is polyethylene glycol mercaptan in which the polyethylene glycol groups have an average molecular weight between about 400 and 10,000.

6. A polymer according to claim 3 in which the alkyl methacrylate is a mixture of octadecyl methacrylate and tridecyl methacrylate and the polyalkylene glycol mercaptan is polyethylene glycol mercaptan in which the polyethylene glycol groups have an average molecular weight between about 400 and 10,000.

References Cited in the file of this patent

UNITED STATES PATENTS

| | | |
|---|---|---|
| 2,411,954 | Burke | Dec. 3, 1946 |
| 2,434,054 | Roedel | Jan. 6, 1948 |
| 2,831,896 | Holly | Apr. 22, 1958 |
| 2,866,776 | Nummy | Dec. 30, 1958 |

FOREIGN PATENTS

| | | |
|---|---|---|
| 582,010 | Great Britain | Nov. 1, 1946 |

OTHER REFERENCES

Flory: "Principles of Polymer Chemistry," Cornell University Press, 1953, pages 146–7.